United States Patent Office 3,267,164
Patented August 16, 1966

3,267,164
PRODUCTION OF MIXTURES OF METHYLCYCLO-
PENTANE AND ISOBUTANE
Robert H. Kozlowski, Berkeley, Calif., assignor to Chevron Research Company, San Francisco, Calif., a corporation of Delaware
No Drawing. Filed Aug. 13, 1965, Ser. No. 479,638
2 Claims. (Cl. 260—666)

This application is a continuation-in-part of Robert H. Kozlowski application Serial No. 248,886, filed January 2, 1963, now abandoned.

It is known that methylcyclopentane and isobutane both are valuable products.

It is well known that methylcyclopentane is a valuable chemical intermediate. It is known that it may be oxidized to yield peroxides, cyclic ketones and aliphatic dibasic acids. It may be alkylated with olefins to produce alkylcyclopentanes and alkylcyclohexanes, which may be dehydrogenated if desired to specific aromatics. Methylcyclopentane also may be isomerized to yield cyclohexane. It may be dehydroisomerized to yield benzene. It may be reacted with oxalyl chloride to yield acid chlorides.

It is known that isobutane is a valuable product for use in gasoline blending operations, in the alkylation of olefins, and as a chemical intermediate for manufacture of iso-olefins which, in turn, are valuable chemical intermediates, for example for isoprene manufacture.

In view of the foregoing, a process which could produce a product mixture rich in both methylcyclopentane and isobutane, from which the desired component could be separated for use as desired, would be useful as well as interesting. Accordingly, it is an object of the present invention to provide such a process.

In accordance with the present invention, there is provided the method of producing a mixture of methylcyclopentane and isobutane that is rich in both of said compounds which comprises hydrocracking a $C_{10}$ aromatic hydrocarbon with a hydrocracking catalyst at a temperature from about 350° to 800° F., preferably 500° to 725° F., a pressure of about from 500 to 3000 p.s.i.g., and a liquid hourly space velocity of about from 0.3 to 5.0, in the presence of at least 500 standard cubic feet of hydrogen per barrel of hydrocarbon feed.

Further in accordance with the present invention, said hydrocracking catalyst comprises at least one hydrogenating component and an active cracking component, for example halided alumina, a conventional silica-alumina cracking component, or a molecular sieve cracking component. Said hydrogenating component comprises a metal selected from the group consisting of platinum and palladium. Platinum is preferred when the catalyst comprises a halided alumina cracking component. Palladium is preferred when the catalyst comprises a molecular sieve cracking component.

The $C_{10}$ aromatic hydrocarbon feed may be a pure feed or may contain other components that do not substantially affect the course of the main reaction, i.e., the feed must consist essentially of a $C_{10}$ aromatic hydrocarbon or a mixture of $C_{10}$ aromatic hydrocarbons. The feed may be derived from straight run stocks by any suitable process, for example extraction, severe reforming, reforming and extraction, coking, etc. A suitable feed also may be obtained by alkylation of benzene, preferably where a substituted benzene, for example diethylbenzene, is available as a by-product of another process. Representative and suitable $C_{10}$ aromatic hydrocarbons include: durene, isodurene, prehnitene, 1,2-diethylbenzene, 1,3-diethylbenzene, 1,4-diethylbenzene, n-butylbenzene, isobutylbenzene, s-butylbenzene, t-butylbenzene, 1-methyl-2-normalpropylbenzene, 1-methyl-3-normalpropylbenzene, 1-methyl-4-normalpropylbenzene, o-cymene, m-cymene, p-cymene, naphthalene, tetralin and methyl indanes.

It has been found that the necessary hydrogenating activity of the catalyst hydrogenating component is intolerably reduced if the aromatic hydrocarbon feed contains more than about 0.1 weight percent sulfur. Accordingly, the feed sulfur content must be below about 0.1 weight percent, preferably below 0.05 weight percent.

The $C_{10}$ aromatic hydrocarbon feed is hydrocracked to produce a yield of methylcyclopentane and isobutane that in each case is higher than the theoretical yield that would be expected from thermodynamic equilibrium considerations.

Accordingly, the process provides a unique and efficient method of converting $C_{10}$ aromatic hydrocarbons in good yields to methylcyclopentane and isobutane.

Table

The following table indicates results obtainable by separate processing of three particular $C_{10}$ aromatic feeds, A, B and C, in accordance with the process of the present invention. Feed A is durene, Feed B is n-butylbenzene, and Feed C is 1,2-diethylbenzene. The feeds are hydrocracked in the presence of hydrogen under the aforesaid hydrocracking conditions, with extinction recycle to the hydrocracking zone of unconverted $C_{10}$ materials. The catalyst in Example 1 comprises a palladium hydrogenating component and a Y-type molecular sieve cracking component. The catalyst in Example 2 comprises a platinum hydrogenating component and a conventional silica-alumina cracking component. The catalyst in Example 3 comprises a platinum hydrogenating component and a chlorided alumina cracking component.

| Product | Volume Percent of Isobutane and Methylcyclopentane Products Based on $C_{10}$ Aromatic Feed, in Total Hydrocracked Product | | |
|---|---|---|---|
| | Example 1 (Feed A) | Example 2 (Feed B) | Example 3 (Feed C) |
| Isobutane | 53.5 | 52.0 | 45.0 |
| Methylcyclopentane | 43.0 | 44.5 | 39.0 |
| Total | 96.5 | 96.5 | 84.0 |

From the foregoing, it may be seen that extremely high volumetric yields of the desired products, based on the $C_{10}$ aromatic feed, may be obtained with the process of the present invention. Similar results may be obtained using various $C_{10}$ aromatic mixtures, as hereinabove discussed.

I claim:
1. The method of producing a mixture of methylcyclopentane and isobutane that is rich in both of said compounds, which comprises hydrocracking a $C_{10}$ aromatic hydrocarbon in the presence of hydrogen at a temperature of about from 500° to 800° F., a pressure of about from 500 to 3000 p.s.i.g., and a liquid hourly space velocity of about from 0.3 to 5.0, with a hydrocracking catalyst comprising an active cracking component and a hydrogenating component selected from the group consisting of platinum and palladium.

2. The method as in claim 1 wherein said hydrocracking catalyst comprises a hydrogenating component on a support selected from the group consisting of a conventional silica-alumina cracking component, a molecular sieve cracking component, and a halided alumina cracking component, said hydrogenating component being platinum when said cracking component comprises halided alumina, and said hydrogenating component being palladium when said cracking component comprises a molecular sieve.

References Cited by the Examiner
UNITED STATES PATENTS

| 3,092,567 | 6/1963 | Kozlowski et al. | 208—111 |
| 3,153,100 | 10/1963 | White | 260—666 |

References Cited by the Applicant
UNITED STATES PATENTS

| 2,422,674 | 6/1947 | Haensel et al. |
| 3,151,172 | 9/1964 | White. |

DELBERT E. GANTZ, *Primary Examiner.*

V. O'KEEFE, *Assistant Examiner.*